United States Patent [19]

Anfuso et al.

[11] Patent Number: 5,086,080
[45] Date of Patent: Feb. 4, 1992

[54] PROCESS FOR THE PREPARATION OF EXPANDABLE BEADS

[75] Inventors: Francesco Anfuso, Mantova; Andrea Mattiussi, Milan; Savino Matarrese, Verona; Italo Borghi, Ferrara, all of Italy

[73] Assignee: Montedipe S. R. L., Milan, Italy

[21] Appl. No.: 538,080

[22] Filed: Jun. 13, 1990

[30] Foreign Application Priority Data

Jul. 5, 1989 [IT] Italy .................................. 21092 A/89

[51] Int. Cl.$^5$ ................................................ C08J 9/20
[52] U.S. Cl. ........................................ 521/59; 521/56; 521/60; 521/139

[58] Field of Search ....................... 521/139, 60, 56, 59

[56] References Cited

U.S. PATENT DOCUMENTS 4,874,796  10/1989  Allen et al. ........................... 521/60

Primary Examiner—Morton Foelak
Attorney, Agent, or Firm—Morgan & Finnegan

[57] ABSTRACT

Exapandable beads of blends of poly (phenylene-ether) and a vinyl aromatic polymer are prepared by carrying out the polymerization of the vinyl aromatic monomer in presence of the poly(phenylene-ether) and of an expanding agent.

13 Claims, No Drawings

PROCESS FOR THE PREPARATION OF EXPANDABLE BEADS

BACKGROUND OF THE INVENTION

1. Field of the Invention

The present invention relates to a process for the preparation of expandable beads.

In more detail, the present invention relates to a process for the precipitation of expandable beads constituted by blends of poly(phenylene-ether) and of a vinyl aromatic polymer.

2. Discussion of the Prior Art

As known the poly(phenylene-ether) resins can be mixed with the vinyl aromatic polymers to form thermoplastic compounds that are extrudable and moldable in moulded articles having high thermal resistance, good impact resistance and hydrolytic stability, and good dimensional stability.

These compounds can also contain flame retarding agents, reinforcing agents and also different quantities and types of expanding agents.

The poly(phenylene-ether) resins and the methods for their production are widely described in the patent literature and to give an example we remind to the U.S. Pat. Nos. 3,306,874, 3,306,875, 3,257,357, 3,257,358, 3,337,501 and 3,787,361. The blends of poly(phenylene-ether) with polymers of vinyl aromatic monomers, included polystyrene, high impact polystyrene and the co- and terpolymers of the styrene, are described in the U.S. Pat. No. 3,383,435.

The foamable blends of poly(phenylene-ether) and vinyl aromatic polymers are known too. These blends are generally used to produce structural foams using molds and techniques analogous to the injection molding process.

From the U.S. Pat. No. 4,727,093 a process is known to obtain low density particles of poly(phenylene-ether) and vinyl aromatic polymers blends. This process consists of incorporating in the already formed granules of the poly(phenylene-ether) and a vinyl aromatic polymer blends, a liquid volatile expanding agent, such as an $C_4$-$C_7$ aliphatic hydrocarbon or $C_1$-$C_2$ fluorocarbon that is able to be absorbed by the blend and that vaporizes at a temperature lower than the glass transition (Tg) one of the blend. To this purpose, the granules as such, or better in aqueous suspension, are treated with the expanding agent in an atmosphere saturated of the mentioned agent for a time sufficient to incorporate such a quantity of it to obtain successively the desired expansion.

After this treatment, the granules are submitted to an expansion process to obtain the low density product. The expansion process takes place by heating at a temperature near the Tg of the blend, preferably carried out by pressurized steam.

These processes for the incorporation of the expanding agent cause different problems that influence both the aspect and the properties of the particles.

As a matter of fact, the known processes bring to a dishomogeneous absorption of the expanding agent by the particles, that after the expansion, cause an unperfect cellular structure (glassy-structure) and also an unperfect and unacceptable diffusion of the expanding agent in the blend. For this reason and because of the unsufficient penetration of the expanding agent, the presence of cores inside the expanded particles is observed.

Moreover the expandable particles obtained by this incorporation method, generally require a quite long maturation to cause a sufficient diffusion of the expanding agent, before their preexpansion.

Moreover the expandable particles obtained by this procedure have only a roughly spherical shape and their diameter is such that it is not possible to use them to mold manufacturers having complex geometrical shapes obtaining a good superficial aspect.

DISCLOSURE OF THE INVENTION

It has now been found by the Applicant that all the above mentioned problems can be avoided if the expanding agent is added in polymerization phase of the vinyl aromatic monomer carried out in presence of poly(phenylene-ether).

It forms therefore, it is an object of the present invention, a process to prepare expandable beads constituted by blends of poly(phenylene-ether) and a vinyl aromatic polymer comprising the following phases:

a) preparing a poly(phenylene-ether) solution in the vinyl aromatic monomer;

b) submitting the vinyl aromatic monomer to polymerization according to known techniques;

c) adding the expanding agent at the beginning or during the polymerization;

The quantity of poly(phenylene-ether) in the solution is between 1 and 50% by weight, preferably between 10 and 40% by weight in comparison with the total solution.

The solution of poly(phenylene-ether) in the vinyl aromatic monomer can be obtained by dissolution of the poly(phenylene-ether) in the vinyl aromatic monomer or by mixing together the phenolic monomer compound and the vinyl aromatic monomer and by carrying out the polymerization of the phenolic compound according to known techniques, in the presence of the vinyl aromatic monomer.

The polymerization of the vinyl aromatic monomer in presence of poly(phenylene-ether) can be carried out in suspension, in bulk or in bulk-suspension according to known techniques, as described in the U.S. Pat. Nos. 3,384,682, 3,487,127 and 3,664,977 and in the Dutch patent application N. 66-17529, whose content is integrant part of the present description.

According to a preferred realization the process of the present invention consists of:

dissolving the poly(phenylene-ether) in a vinyl aromatic monomer;

dispersing the resulting mixture in water;

submitting the vinyl aromatic monomer to polymerization in the presence of an efficacious quantity of at least one initiator;

adding the expanding agent during the polymerization.

The poly(phenylene-ether)/vinyl aromatic monomer mixture is dispersed in water with the help of an organic or inorganic dispersing agent, the ratio, by weight, mixture/water is between 2 and 0.5, the mixture is then submitted to polymerization at high temperature in presence of at least an efficacious quantity of a peroxidic initiator.

Suitable initiators to be used are the organic peroxides such as dibenzoyl peroxide, dicaproyl peroxide, dilauroyl peroxide, t.butylperbenzoate, di-t.butyl peroxide, t.butyl-peracetate, cyclohexanone peroxide etc.

It is preferred to carry out the polymerization in suspension using two peroxidic initiator systems that act at different temperatures, such as for example dibenzoyl peroxide and t.butylperbenzoate, dibenzoyl peroxide and t.butyl peroxide or t.butyl peracetate, cyclohexanone peroxide and dicumil peroxide etc.

The used quantity of peroxidic initiators is usually between 0.02 and 3% by weight, preferably between 0.5 and 1.5% by weight, in comparison with the fed monomer to the polymerized.

It is preferred to carry out the polymerization initially at low temperature, generally below 100° C., until the yield of a determined polymerization degree (60-90%), then to complete the polymerization at higher temperatures such as 110°-135° C.

Examples of organic and inorganic suspending agents include carboxy-methyl cellulose, hydroxy ethyl cellulose, methyl-cellulose, tricalcium phosphate, acrylic-acid-2 ethyl-hexacrilate copolymer etc.

As an alternative, the polymerization of the vinyl aromatic monomer can be carried out according to the bulk-suspension technology that consists of:

dissolving the poly(phenylene-ether) in a vinyl aromatic monomer prepolymerizing the vinyl aromatic monomer in bulk at a temperature between 110° and 130° C. with the eventual help of a peroxide initiator, until the yield of a conversion of 10-45% by weight of polymerized vinylic monomer.

suspending this polymerized mass in water by using an organic or inorganic suspending system of the above mentioned kind;

adding the expanding agent; and completing the polymerization in suspension.

As polymerization initiators the organic peroxides of the above mentioned kind can be used.

Any liquid expanding agent at room temperature and able to be incorporated in the polymeric material without altering its characteristics, can be used in the process of the present invention.

The best results are obtained by employing expanding agents having a boiling point below 100° C.

Examples of suitable expanding agents are the aliphatic hydrocarbons, as such or in blend, containing from 2 to 7 carbon atoms such as butane, pentane, iso-pentane, hexane, heptane, cyclopentane etc., the hydrogenated derivatives of aliphatic hydrocarbons containing from 1 to 2 carbon atoms, such as chloroform, methylen chloride, chloro-fluoro carbons such as $CCl_3F$, $CCl_2F_2$, $CHClF_2$, $CClF_2-CClF_2$, commercially known as Freon 11, Freon 12, Freon 22 and Freon 114.

The expanding agent can be added at the beginning or during the polymerization. Practically it is preferred to add it during the polymerization process that is carried out under pressure.

The expanding agent is added in a quantity between 1 and 30% by weight, in comparison with the poly(phenylene-ether)-vinyl aromatic monomer solution.

Besides the expanding agent other conventional additives can be added such as flame retarding agents, stabilizers, plasticizers, antioxidizers, pigments, nucleants etc.

Though the sytrene is the preferred vinyl aromatic monomer in the process of the present invention, other vinyl aromatic monomers can be used as starting monomeric material both as such and blended together. By the term vinyl aromatic monomer, as used in the present invention, is meant all the monomers having formula:

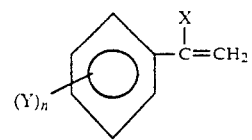

in which:

X represents hydrogen or an alkyl radical having from 1 to 4 carbon atoms;

Y represents hydrogen, a halogen or an alkyl radical having from 1 to 4 carbon atoms; and n is 0 or an integer between 1 and 5.

Examples of vinyl aromatic monomers having the above reported formula (I) are: methyl-styrene; mono-, di- tri-, tetra- and penta-chloro styrene and the corresponding alpha-methyl styrenes; mono- and di-bromo-styrene, styrenes alkylated in the nucleus and the corresponding alpha-methyl-styrenes, such as ortho- and para-methyl styrenes, ortho- and para-ethyl styrenes; etc. These monomers can be used singularly, mixed together or mixed with styrene. These monomers can also be copolymerized with other additives to form impact resistant polymers modified with rubber. The rubber can be of the natural or synthetic kind such as for example polybutadiene, polyisoprene, ethylene-propylene (EPM), ethylene-propylene-diene (EPDM), siliconic rubbers or styrene (A)-butadiene (S) block rubbers of any kind such as SB, SBS, SBSB etc.

The vinyl aromatic monomer having formula (I) can also contain quantities below 50% by weight of one or more other copolymerizable monomers such as acrylonitrile, metacrylonitrile, methyl-metacrilate, male-ic anhydryde, metacrylic acid etc.

The poly(phenylene-ether) used in the process of the present invention includes repeating units having formula

$$[-AR-O]_n \qquad (II)$$

in which AR is a bivalent aryl radical and n is an integer between 10 and 1000. The bivalent aryl radical can be both substituted and not substituted.

Preferred poly(phenylene-ethers) are those having repeating structural units having formula:

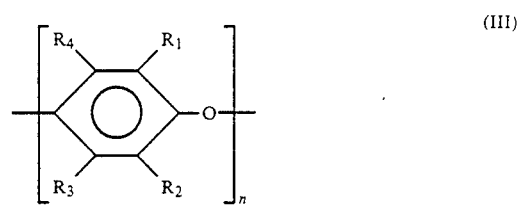

in which $R_1$, $R_2$, $R_3$, $R_4$, equal or different from one another, can be hydrogen, an alkyl radical containing from 1 to 10 carbon atoms, such as methyl, ethyl, propyl, butyl, pentyl etc., a halogen such as chlorine, bromine etc., an aralkyl, alkyl-aryl or aryl radical having from 7 to 20 carbon atoms and n is at least 50, preferably between 50 and 200. Examples of poly(phenylene-ethers) include:

poly-(2,6-dimethyl-1,4-phenylene-ether);
poly-(2-methyl-1,4-phenylene-ether);
poly-(3-methyl-1,4-phenylene-ether);
poly-(2,6-diethyl-1,4-phenylene-ether);

poly-(2,6-dipropyl-1,4-phenylene-ether);
poly-(2,6-dichloromethyl-1,4-phenylene-ether);
poly-(2-methyl-6-allyl-1,4-phenylene-ether);
poly-(2,6-dibromomethyl-1,4-phenylene-ether);
poly-(2,6-dichloro-1,4-phenylene-ether);
poly-(2,6-diphenyl-1,4-phenylene-ether);
poly-(3,5-dimethyl-1,4-phenylene-ether);
poly-(2,5-dimethyl-1,4-phenylene-ether);
poly-(2,3,5-trimethyl-1,4-phenylene-ether);
poly-(2,3,6-trimethyl-1,4-phenylene-ether);
poly-(2,3,5,6-tetramethyl-1,4-phenylene-ether);

The poly(phenylene-ethers) can be obtained by means of known techniques by oxidative coupling of phenolic compounds as described in the above mentioned patent literature.

In order to understand better the present invention and to put it into practice, some examples are reported having exemplifying and illustrative purpose without limitation of the scope of the invention.

EXAMPLE 1

Into a 5 l. laboratory reactor were introduced:
a solution composed of 20 parts of poly(2,6-dimethyl-1,4-phenylene-ether), having an intrinsic viscosity of about 0.5 dl/g, as measured in chloroform at 25° C., produced by ENICHEM San Donato Milanese (Milano), and by 100 parts by weight of styrene;
130 parts by weight of water;
0.6 parts by weight of tricalcium phosphate;
0.03 parts by weight of dodecyl-benzen-sodium sulphoponate;
0.6 parts by weight of dibenzoyl peroxide; and
0.6 parts by weight of t.butyl-perbenzoate.

The mixture was degassed with nitrogen for 30 minutes at 60° C. and heated at 90° C. under stirring.

The mixture was kept at this temperature for 6 hours. Then 0.4 parts by weight of tricalcium phosphate and 13 parts by weight of pentane were added and the temperature was brought at 120° C. under pressure and kept for further 5 hours.

The reaction mass was then cooled down at room temperature and the obtained beads were separated by filtration.

Expandable beads were obtained having a diameter of about 0.8 mm and having incorporated about 7% of pentane. After the expansion the beads showed a fine and homogeneous cellular structure and had a density of about 25 g/l.

EXAMPLE 2

The synthesis was carried out in the same conditions of example 1 using:
a solution constituted by 40 parts by weight of poly(2,6-dimethyl-1,4-phenylene-ether) of example 1 and 100 parts by weight of styrene;
0.9 parts by weight of tricalcium phosphate;
0.003 parts by weight of dodecyl-benzen-sodium sulphunate;
0.8 parts by weight of dibenzoyl peroxide;
0.7 parts by weight of tertiary butyl perbenzoate; and
130 parts by weight of demi water.
After heating at 90° C. for six hours:
0.4 parts by weight of tricalcium phosphate and
15 parts by weight of pentane were added.

Also in this case expandable beads were finally obtained of about 0.8-0.9 mm diameter containing about 7% of pentane, after preexpansion the beads showed a fine and homogeneous cellular structure and a density of 25 g/l.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The above references are hereby incorporated by reference.

What is claimed is:

1. Process for the preparation of expandable beads constituted by blends of poly(phenylene-ether) and a vinyl aromatic polymer and containing an expanding agent, which process consists essentially of:
   dissolving a poly(phenylene-ether) in a vinyl aromatic monomer;
   prepolymerizing the vinyl aromatic monomer, at a temperature between 100° C. and 130° C., optionally in the presence of a peroxide initiator, to obtain a conversion of 10-45% by weight of polymerized vinyl aromatic monomer;
   suspending this prepolymerized mass in water;
   adding the expanding agent; and
   completing the polymerization in the aqueous suspension.

2. Process according to claim 1, wherein it consists of:
   a) preparing a solution of poly(phenylene-ether) in the vinyl aromatic monomer;
   b) submitting the vinyl aromatic monomer to polymerization, and
   c) adding the expanding agent at the beginning or during the polymerization.

3. Process according to claim 1, wherein the poly(phenylene-ether) solution in the vinyl aromatic monomer is obtained by mixing together the phenolic monomer compound and the vinyl aromatic monomer, and carrying out the polymerization of the phenolic compound in the presence of the vinyl aromatic monomer.

4. Process according to claim 1, wherein the polymerization of the vinyl aromatic monomer is carried out in bulk, in suspension or in bulk-suspension.

5. Process according to claim 1, wherein it consists of:
   dissolving the poly(phenylene-ether) in a vinyl aromatic monomer;
   dispersing the resulting mixture in water;
   submitting the vinyl aromatic monomer to polymerization in the presence of an efficacious quantity of at least one initiator; and
   adding the expanding agent during the polymerization.

6. Process according to claim 1, wherein the quantity of poly(phenylene-ether) in the suspension is between 1 and 50% by weight.

7. Process according to claim 1, wherein the quantity of the expanding agent is between 1 and 30% by weight in comparison with the poly(phenylene-ether) and vinyl aromatic monomer solution.

8. Process according to claim 1, wherein the vinyl aromatic monomer has formula (I)

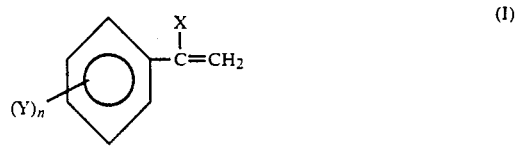

wherein:

X represents hydrogen or an alkyl radical having from 1 to 4 carbon atoms;

Y represents hydrogen, a halogen or an alkyl radical having from 1 to 4 carbon atoms; and n is 0 or an integer between 1 and 5.

9. Process according to claim 1, wherein the vinyl aromatic monomer is polymerized in the presence of a rubber.

10. Process according to claim 1, wherein the vinyl aromatic monomer contains a quantity below 50% by weight of a copolymerizable monomer from the group consisting of such as acrylonitrile, methacrylonitrile, methyl methacrylate, maleic anhydride or methacrylic acid and mixtures thereof.

11. Process according to claim 1, wherein the poly(phenylene-ether) has formula:

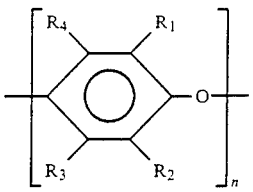

in which $R_1$, $R_2$, $R_3$, and $R_4$ equal or different from one another, are hydrogen, an alkyl radical containing from 1 to 10 carbon atoms, a halogen from the group consisting of chlorine and bromine, an aralkyl, alkyl-aryl or aryl radical having from 7 to 20 carbon atoms and n is at least 50.

12. Process according to claim 6, wherein the quantity of poly(phenylene-ether) in the suspension is between 10 and 40% in comparison with the solution.

13. Process according to claim 11, wherein n is between 50 and 200.

* * * * *